Figure 1:
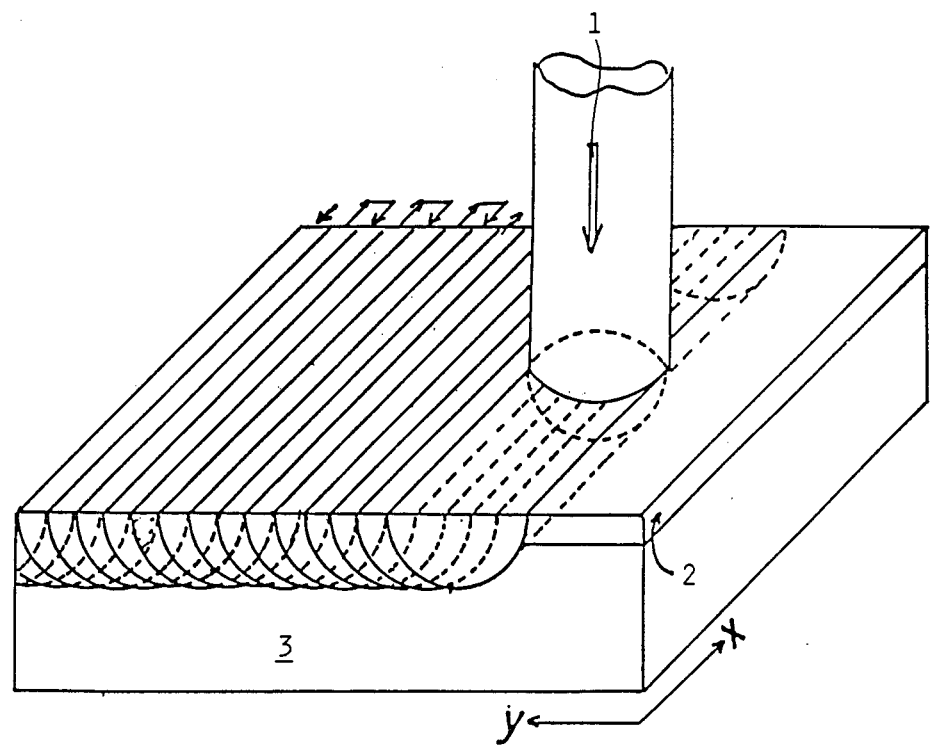

United States Patent [19]

Hashimoto et al.

[11] Patent Number: 4,772,773
[45] Date of Patent: Sep. 20, 1988

[54] METHODS FOR PREPARATION OF OVERLAID AMORPHOUS ALLOY LAYERS

[75] Inventors: Koji Hashimoto, 25-5, Shogen 2-chome, Izumi-shi, Miyagi-ken; Naokazu Kumagai, Matsudo; Katsuhiko Asami, Sendai, all of Japan

[73] Assignees: Daiki Engineering Co., Ltd., Tokyo; Koji Hashimoto, Miyagi, both of Japan

[21] Appl. No.: 861,371

[22] Filed: Feb. 18, 1986

Related U.S. Application Data

[63] Continuation-in-part of Ser. No. 724,592, Apr. 18, 1985, abandoned.

[30] Foreign Application Priority Data

May 12, 1984 [JP] Japan .................................. 59-93901

[51] Int. Cl.$^4$ .............................................. B23K 26/00
[52] U.S. Cl. .......................... 219/121.64; 219/121.14; 219/121.66; 219/121.82

[58] Field of Search ................. 219/121 LD, 121 LC, 219/121 LE, 121 LF, 121 EC, 121 ED, 121 EF, 121 EG, 121 LY, 121 L, 121 LM; 427/53.1; 428/680, 681–684, 660, 637, 638

[56] References Cited

U.S. PATENT DOCUMENTS 4,212,900  7/1980  Serlin ............................. 219/121 LF
4,495,255  1/1985  Draper et al. ............... 215/121 LM Primary Examiner—C. L. Albritton
Attorney, Agent, or Firm—Larson and Taylor

[57] ABSTRACT

Methods for preparation of overlaid uniform amorphous alloy layers of prescribed compositions and thicknesses bonded tightly to the substrate metals are described. The methods involve previously coating the substrate metal surface with metal layers and irradiating with high energy density beams to cause a melting of the metal layer or layers including, if necessary, a portion of the substrate metal and thereby forming a uniform alloy metal of prescribed composition tightly bonded to the substrate metal surface, said irradiation being carried out during movement of the substrate or beams so as to control irradiation time and depth.

3 Claims, 1 Drawing Sheet

METHODS FOR PREPARATION OF OVERLAID AMORPHOUS ALLOY LAYERS

This application is a continuation-in-part of application Ser. No. 724,592 filed Apr. 18, 1985, now abandoned.

The present invention relates to the preparation of overlaid uniform amorphous alloy layers of prescribed compositions and thicknesses on conventional metallic materials.

Among the characteristics required for metallic materials, there are a number of those which are sufficient to be possessed not by the metallic materials themselves but only by their surfaces. Overlaid metal layers providing such characteristics have so far been prepared by melt deposition, electrodeposition, electroless deposition, diffusion coating, vapor deposition, vacuum deposition, etc. However, the overlaid layers prepared by these methods are mostly single elements and overlaid metals are not widely varied. Furthermore, the overlaid layers thus prepared are often defective, hardly uniform, and sufficiently bonded to the and substrate metals. It is, therefore, difficult to expect high strength in combination with considerable toughness, high corrosion resistance and special surface activities for the overlaid layers thus prepared.

In general, alloys are crystalline in the solid state. However, rapid quenching from the liquid state of the specific compositions leads to solidification into the amorphous structure similar to the liquid structure without having the crystalline structure even in the solid state. These alloys are called amorphous alloys. The amorphous alloys thus formed have a very high mechanical strength with a considerable toughness, and some of them possess extremely high corrosion resistance and/or excellent catalytic activities for specific chemical reactions.

The present invention relates to methods for the preparation of amorphous alloys having excellent characteristics, which are difficult to obtain from conventional crystalline metals, as overlaid uniform alloy layers of prescribed compositions and thicknesses on conventional metallic materials.

On the other hand, laser beam, electron beam and other high energy density beams are able to melt locally any kind of surface metal layers without injection of a large amount of heat into the surrounding solid by controlling the energy density and irradiation time. Accordingly, after the substrate metal surface is adhesively covered with metals of prescribed compositions in average even in inhomogeneous multiple phases or multiple layers, the irradiation of high energy density beams leads to melting to the prescribed depth including a portion of the substrate metal, if necessary, and to formation of a uniform alloy melt of prescribed composition. If a small volume of alloy surface is melted without injection of a large amount of heat into the surrounding solid by controlling the time and energy density of beam irradiation, the cessation of the beam irradiation immediately leads to rapid quenching of the melt due to heat absorption by the surrounding solid with a consequent formation of the amorphous structure. Vitrification of a wide surface area requires overlapping of traces melted by high energy density beams. The control of the time and energy density of beam irradiation is, therefore, required not only for the control of the melt composition suitable for vitrification by rapid quenching but also for the prevention of crystallization of the previously vitrified phase in the heat-affected zone of the next beam traces as well as for assuring rapid quenching of the melt by heat absorption by the surrounding solid which has not been severely heated during the melt formation. In general, the time of beam irradiation to melt individual surface sites next to the previously vitrified phase must be shorter than $10^{-2}$ sec in order to avoid crystallization of the previously vitrified phase in the heat affected zone of the next beam trace. Even if the time of beam irradiation is shorter than $10^{-2}$ sec, excess injection of heat leads to slow cooling of the melt and hence prevents vitrification. In order to assure vitrification by overlapping of the treatment consisting of melting and subsequent rapid quenching the product of energy density of beam irradiated and beam irradiation time for melting must be smaller than 5 joule. sec/cm$^2$.

The present inventors utilized the characteristics of the high energy density beams so as to satisfy the conditions necessary for vitrification of metal surfaces and succeeded in preparing overlaid amorphous alloy layers of prescribed compositions and thicknesses which were tightly bonded to the substrate metals.

Preparation of overlaid uniform amorphous alloy layers of complicated compositions by irradiation of high energy density beams requires previously coating the substrate metals with metal layers or metal sheets before the irradiation treatment by high energy density beams. The average compositions and thicknesses of the metal layers or metal sheets previously coated must be chosen in such a way that, after the beam-irradiation melting and alloying of either only the metal layers or sheets or both the metal layers or sheets and a portion of the substrate metals, the composition and volume of the melt thus formed are suitable for vitrification by heat absorption by the solid surrounding the melt.

When the metal layers with which the substrate metals are previously coated by various procedures such as metal powder coating and various kinds of depositions are not tightly bonded to the substrate metals, the high energy density beams must be irradiated so as to melt a portion of the substrate metals together with the metal layers for the preparation of the overlaid uniform amorphous alloy layers bonded tightly to the substrate metals.

On the other hand, when the metal layers or other metal sheets of prescribed compositions are previously bonded tightly to the substrate metals by heat treatment prior to the beam irradiation, it is not always necessary that the beam irradiation melt a portion of the substrate metals together with the metal sheets or metal layers unless alloying the metal sheets or metal layers with a portion of the substrate metals is requested. In this case, prior to the irradiation treatment by the high energy density beams, the metal layers of metal sheets placed on the substrate metals are heat-treated in various atmospheres, including vacuum and inert gases, at about the melting points of the metal layers or metal sheets for bonding the metal layers or metal sheets to the substrate metals. The high energy density beams are irradiated to the specimens, by which the metal layers or metal sheets are tightly bonded to the substrate metals, during movement of the specimens or beams. The irradiation treatment is carried out under conditions whereby the power of the high energy density beams and the rate of the movement of the specimens or beams are controlled. These conditions control the melt depth, the melt compositions and the quenching conditions after beam melting, and accordingly provide rapid solidification of homogeneous alloy melts by heat absorption by the surrounding cold solids.

Figure 2:
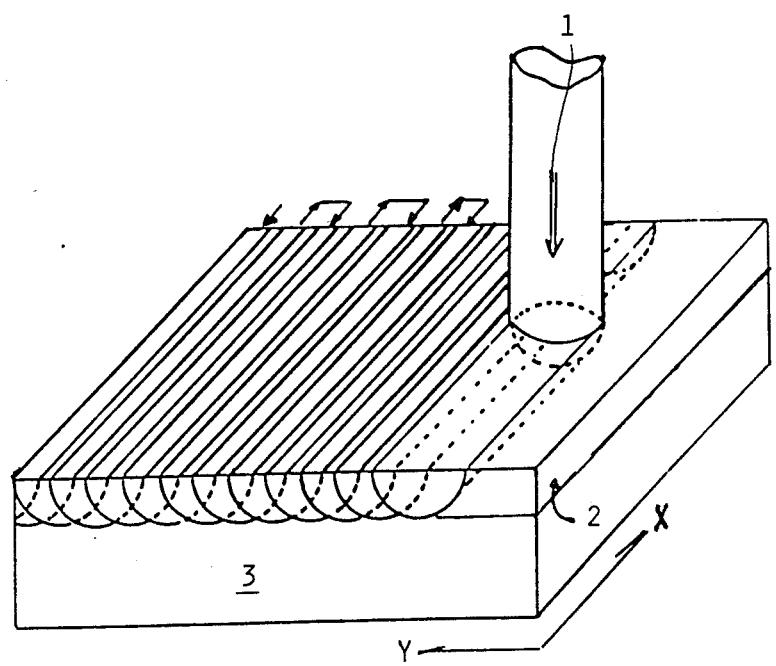

FIGS. 1 and 2 show schematic geometries of high energy beam treatment.

In FIGS. 1 and 2 specimens are composed of a previously coated metal layer (2) on a substrate metal (3). The specimens are placed on a table which is reciprocated along the X-axis. At each end of the movement along the X-axis the table on which the specimen is mounted is shifted a constant distance along the Y-axis. On the other hand, if the high energy density beam is caused to traverse the specimen surface along the X-axis, the table is not reciprocated along the X-axis but shifted a constant distance along the Y-asix at each end of the beam traverse.

In FIG. 1, during the downward irradiation of the high energy density beam (1) the energy density of the beam and the duration of melting of individual portion of the specimen are carefully controlled so as to melt both the previously coated metal layer and a prescribed thickness of the substrate metal with a consequent formation of an alloy metal suitable for vitrification by heat absorption mostly by the cold substrate metal which is not overheated by the beam irradiation.

In FIG. 2, the surface metal layer (2) is previously bonded tightly to the substrate metal (3) by heat treatment in order to facilitate the heat absorption of the substrate metal from the melted surface metal layer in addition to prevention of exfoliation of the metal layer during the irradiation of the beam (1). during the downward beam irradiation the energy density of the beam and the duration of melting of individual portion of the specimen are carefully controlled so as to melt the prescribed thickness of the previously coated metal layer with a consequent formation of an alloy metal suitable for vitrification by heat absorption mostly by the cold substrate metal which is not overheated by the beam irradiation.

The formation of bonding between the metal layers or metal sheets to the substrate metals by heat treatment is determined by the wettability of the substrate metals with the metal layers or metal sheets, the mutual solubility of the metal layers or metal sheets and the substrate metals, etc. Hence, melting the metal layers or metal sheets by heat treatment does not always result in bonding between the metal layers or metal sheets and the substrate metals. Furthermore, the formation of an alloy layer at the interface between the metal layers or metal sheets and the substrate metals by the heat treatment results sometimes in thermal discontinuity at the interface which prevents self quenching after beam melting. Consequently, in another aspect of the invention, before the metal layers or metal sheets are placed on the substrate metals, the substrate metals are covered with a metal or metals capable of bonding easily to both the substrate metals and the metal layers or metal sheets by heat treatment. Subsequently, the metal layers or metal sheets are bonded tightly to the substrate metals by heat treatment and finally the irradiation treatment by the high energy density beams is carried out to prepare the overlaid uniform metal layers bonded tightly to the substrate metals. The previous coverage with a metal or metals can be done by various procedures such as melt deposition, electrodeposition, electroless deposition, vapor deposition, etc.

On the other hand, the metal sheets which are placed on the substrate metals are sometimes composed of complicated compositions. It is sometimes difficult to prepare the metal sheets of complicated compositions by conventional processes such as casting, forging and rolling. In such a case, the metal sheets can be prepared directly from the alloy liquids by the rapid solidification techniques in which the alloy liquids are impinged on the outer or inner surface of a rapidly rotating wheel, since thin metal foils are easily formed by rapid solidification which extends the solid solubility.

Consequently, the methods of the present invention wherein previously coated substrate metal surfaces with the metal layers or metal sheets are subsequently subject to irradiation treatment by the high energy density beams enable preparation of overlaid uniform amorphous alloy layers bonded tightly to the substrate metals. In particular, in these methods, the volume of the melt formed at a moment by irradiation of high energy density beams is very small and the heat of the melt is rapidly absorbed by the surrounding cold solids. These methods, therefore, provide preparation of overlaid amorphous alloy layers bonded tightly to the conventional crystalline metals if the surface compositions are suitable for vitrification by rapid quenching from the liquid state.

The methods of the present invention will be further illustrated by certain examples which are provided only for purpose of illustration and are not intended to limit the present invention.

EXAMPLE 1

This is an example of preparation of an overlaid amorphous Ni-Fe-Cr-P alloy layer on a mild steel rod. A 50 $\mu$m thick Ni-25at%P alloy was first electroplated on a mild steel rod of 20 mm diameter and subsequently a 10 $\mu$m thick chromium was further electroplated. During rotation of the rod with a lathe at 440 rpm a 400 W.$CO_2$ laser beam whose diameter on the rod surface was 100 $\mu$m, was irradiated, and the rod was shifted along the length of the rod about 70 $\mu$m during each rotation. This laser irradiation treatment led to homogeneous melting chromium, Ni-25at%P alloy and 10 $\mu$m deep mild steel surface. The melting and subsequent self quenching resulted in formation of an overlaid amorphous Ni-14at%Fe-14at%Cr-18at%P alloy layer bonded tightly to the substrate mild steel.

EXAMPLE 2

This is an example of preparation of an overlaid amorphous Fe-CR-P-C alloy layer on a mild steel plate. A mixture of 50 wt% iron carbide, 40 wt% iron phosphide and 10 wt% chromium was powdered by crushing. A liquid paraffine-coated mild steel plate of 10 mm thickness was covered with the powder and was placed on the x-y table. A 200 W.$CO_2$ laser beam whose diameter on the specimen surface was 100 $\mu$m was irradiated during movement of the specimen along the x-axis at 436 mm/sec. After laser irradiation from one end to the other end of the specimen along the x-axis the specimen was shifted about 70 $\mu$m along the y-axis and the direction of the specimen movement was reversed. The repetition of this procedure, that is, laser irradiation to the reciprocating specimen resulted in homogeneous melting and vitrification of the entire surface of the specimen and hence in preparation of an overlaid 50 $\mu$m thick amorphous Fe-8at%Cr-13at%P-7at%C alloy layer bonded tightly to the substrate mild steel.

EXAMPLE 3

This is an example of preparation of overlaid corrosion-resistant amorphous Fe-Cr-Ni-P-C alloy layers on a conventional nickel metal. Cast alloys were prepared from iron phosphide, iron carbide, iron and chromium by induction melting, and then the rotating wheel method was applied to obtain alloy sheets of 1–5 mm width and 20–30 μm thickness from the cast alloy. These sheets were spot-welded to the surface of conventional nickel metal of 20 mm width, 60 mm length and 1 or 5 mm thickness. After a quartz tube in which the specimens were placed was evacuated, it was inserted into a furnace of the prescribed temperature for a short time to melt the metal sheets and to spread the melts uniformly on the substrate nickel metal and then the specimens were quenched in water or a silicon oil. By this procedure, overlaid crystalline Fe-CR-P-C alloy layers bonded tightly to the substrate nickel were prepared. The overlaid layers were alloyed with a portion of the substrate nickel. Since the overlaid layers consisted of multiple phases with a brittle nature and had poor corrosion resistance, the laser irradiation treatment was carried out to vitrify the overlaid metal layers. The specimens were placed on the x-y table and moved along the x-axis at 400 mm/sec. During the movement of the specimen along the x-axis a 500 W.$CO_2$ laser beam was focused on the specimen surface. After laser irradiation from one end to the other end of the specimen along the x-axis the specimen was shifted about 75 μm along the y-axis and the direction of the specimen movement along the x-axis was reversed. The repetition of this procedure, that is, the laser irradiation to the reciprocating specimens led to the preparation of overlaid uniform amorphous Fe-Cr-Ni-P-C alloy layers with extremely high corrosion resistance and high mechanical strength with considerable toughness. These layers were tightly bonded to the substrate nickel metal.

EXAMPLE 4

The overlaid amorphous Fe-Cr-Ni-P-C alloy layers described in Example 3 were prepared on a conventional mild steel. Various Fe-Cr-P-C alloy sheets written in Example 5 were not tightly bonded directly to the mild steel by the heat treatment. Accordingly, the substrate mild steel was previously covered with 1–3 μm thick nickel plating, and then the Fe-Cr-P-C alloy sheets were bonded to the nickel-plated mild steel by the same procedure written in Example 3. The laser irradiation treatment was carried out similarly to Example 3 and led to preparation of overlaid uniform amorphous Fe-Cr-Ni-P-C alloy layers with extremely high corrosion resistance and high mechanical strength in combination with considerable toughness bonded tightly to the substrate mild steel.

EXAMPLE 5

This is an example of preparation of overlaid amorphous Pd-P alloy layers on a conventional nickel metal. Cast alloys were prepared by induction melting of homemade palladium phosphides and palladium metal. The rotating wheel method was used to prepare various Pd-P alloy sheets of 5 mm width and 10 μm thickness from the cast alloys. The alloy sheets were spot-welded on the conventional nickel metal of 20 mm width, 60 mm length and 2 mm thickness. After a quartz tube in which the specimens were placed was evacuated, it was inserted into a furnace of the prescribed temperature for a short time. When the alloy sheets were melted they were alloyed with a portion of the substrate nickel metal and spread uniformly over the substrate nickel metal. Subsequently they were quenched in water or in a silicon oil. By these procedures. The overlaid crystalline Pd-Ni-P alloy layers bonded tightly to the substrate nickel were prepared but the overlaid layers consisted of two phases of palladium-nickel phosphide and fcc palladium-nickel and hence were brittle. Accordingly they were vitrified by the laser irradiation treatment to prepare corrosion resistant metal layers with high mechanical strength. The specimens were placed on the x-y table and were moved at 100–800 mm/sec. along the x-axis. During the movement along the x-axis, 300–500 W.$CO_2$ laser beams were focused on the specimen surfaces. After laser irradiation from one end to the other end of the specimens along the x-axis the specimens were shifted 75–200 μm along the y-axis and the direction of the specimen movement was reversed. The repetition of this procedure, that is, laser irradiation to the reciprocating specimens resulted in formation of overlaid amorphous Pd-Ni-P alloy layers with high mechanical strength in combination with considerable toughness bonded tightly to the substrate nickel metal.

EXAMPLE 6

This is an example of preparation of overlaid amorphous Pd-Ni-Ti-P alloy layers on a conventional titanium metal. Various Pd-P alloys described in Example 5 were tried to bond to the conventional titanium by the heat treatment written in Example 5. It was, however, difficult to prevent alloying the Pd-P alloys with large amounts of titanium by the heat treatment. This decreased the glass-forming ability of the metal sheets. Hence, about 1 μm thick nickel was previously plated to the substrate titanium metal and then the same procedures as Example 5 were applied. By this method, the overlaid uniform and high strength amorphous Pd-Ni-Ti-P alloy layers were formed, which were bonded tightly to the substrate titanium metal.

As can be seen from these examples the present invention provides preparation of overlaid uniform and homogeneous amorphous alloy layers having specific characteristics bonded tightly to the substrate metals, in spite of the fact that the preparation of overlaid amorphous alloy layers is quite difficult by conventional methods.

What is claimed is:

1. A method for the preparation of overlaid uniform amorphous alloy layers of prescribed compositions and thicknesses, which are bonded tightly to substrate metals, characterized in that
    (a) substrate metal surfaces are previously coated with metal layers by using at least one of the following procedures; metal powder coating with and without binders capable of possessing proper adhesiveness, melt deposition, electro-deposition, electroless deposition, diffusion coating, vapor deposition, ion plating, spray coating;
    (b) the average compositions and thicknesses of the metal layers are determined in such a way that the composition and volume of the melt formed by subsequent beam-irradiation-melting of the metal layers along with a portion of the substrate metal are suitable for vitrification by heat absorption by the solid surrounding the melt;
    (c) high energy density beams including laser and electron beams are irradiated to specimen surfaces of the metal layer-covered substrates during scanning of the specimens with beams, in which the scanning controls the time of irradiation, the depth of melts and the energy density of beam irradiated, and hence controls the compositions and volumes of melts for vitrification in addition to suppression of the temperature rise of the solid surrounding the melts so as to guarantee vitrification by rapid quenching of the melt after the beam irradiation; scanning of the specimens with beams is carried out by at least one of methods of specimen movement and beam oscillation;

(d) irradiation of the high energy density beams melts simultaneously the metal layers and the prescribed depth of the substrate metals and thereby leading to alloying the metal layers with the substrate metals as well as homogenization and the subsequent self quenching for heat absorption from the melt by the surrounding solid and hence to the preparation of overlaid uniform amophous alloy layers of prescribed compositions and thicknesses, which are tightly bonded to the substrate metals; simultaneous melting both the metal layers and the prescribed depth of the substrate metals is required due to the following reasons: the metal layers prepared by at least one of the procedures described in (a) are not always tightly bonded to the substrate metals, and therefore, the beam irradiation to melt only the metal layers results in poor absorption of the heat of the metal layers by the substrate metals and gives rise to rapid evaporation and exfoliation of the metal layers along with the formation of round-shaped alloy melt by the surface tension of the liquid.

2. A method for the preparation of overlaid uniform amorphous alloy layers of prescribed compositions and thicknesses, which are bounded tightly to substrate metals, characterized in that (a) substrate metal surfaces are previously coated with metal layers by heat treatment in various atmospheres including vacuum and inert gases after placing metal layers of the prescribed compositions on the substrate metals including the metal layers prepared by the procedures described in claim 1(a);

(b) the average compositions and thicknesses of the metal layers are determined in such a way that the composition and volume of the melt formed by subsequent beam-irradiation-melting of the metal layers, if necessary, along with a portion of the substrate metal are suitable for vitrification by heat absorption by the solid surrounding the melt;

(c) high energy density beams including laser and electron beams are irradiated to specimen surfaces of the metal layer-covered substrates during scanning of the specimens with beams, in which the scanning controls the time of irradiation, the depth of melts and the energy density of beam irradiated, and hence controls the compositions and volumes of melts for vitrification in addition to suppression of the temperature rise of the solid surrounding the melts so as to guarantee vitrification by rapid quenching of the melt after the beam irradiation; scanning of the specimens with beams is carried out by at least one of methods of specimen movement and beam oscillation;

(d) the beam irradiation melts the previously coated metal layers, if necessary, along with a portion of the substrate metals, and subsequent self quenching for heat absorption from the melt by the surrounding solid results in the preparation of overlaid uniform amorphous alloy layers of prescribed compositions and thicknesses, which are bonded tightly to the substrate metals, because evaporation and exfoliation of the previously coated metal layers during the beam irradiation do not occur due to formation of tight bond between the substrate metals and the metal layers by the heat treatment described in (a); it is therefore not always necessary for the preparation of overlaid homogenous amorphous alloy layers that irradiation of high energy density beams mealts a portion of the substrate metals together with the metal layers; hence the overlaid uniform amorphous alloy layers bonded tightly to the substrate metals can be formed by melting the metal layers by irradiation of high energy density beams, and a portion of the substrate metals along with the metal layers is melted for alloying the metal layers with the substrate metals.

3. (a) A method as described in claim 2 wherein before placing the metal layers of prescribed compositions on the substrate metals including the metal layers prepared by the procedures as described in claim 1(a), the substrate metals are covdered by metal coatings capable of bonding early to both the substrate metals and the metal layers during the heat treatment described in claim 2(a);

(b) the average compositions and thicknesses of the metal coatings on the substrate metals are determined in such a way that the composition and volume of the melt formed by beam-irradiation-melting of the metal layers including, if necessary, the metal coatings and further, if necessary, a portion of the substrate metals are suitable for vitrification by heat absorption by the solid surrounding the melt.

* * * * *